Dec. 7, 1937.  C. FIELD  2,101,055

BRINE ICE

Original Filed Aug. 14, 1931

INVENTOR
*Crosby Field*
BY
*Blair, Curtis & Dunne*
ATTORNEYS

Patented Dec. 7, 1937

2,101,055

UNITED STATES PATENT OFFICE 2,101,055

BRINE ICE

Crosby Field, Brooklyn, N. Y., assignor to Flakice Corporation, Brooklyn, N. Y., a corporation of Delaware Original application August 14, 1931, Serial No. 557,108. Divided and this application April 24, 1935, Serial No. 18,050

2 Claims. (Cl. 62—1)

This invention pertains to the manufacture of an ice product (such as brine ice) having a melting point below 32° F. and to the product obtained thereby. Sodium chloride brine ice has been selected as illustrative of a product embodying the invention.

This application is a division of my copending application Serial No. 557,108, filed Aug. 14, 1931, Patent No. 2,005,734, issued June 25, 1935, which relates to heat exchange apparatus of the type wherein liquid to be congealed is supplied to an ice-shaping surface and congealed. Thereafter it is removed from the surface in the form in which it is shaped.

It is an object of the present invention to provide an improved brine ice product. Other objects will be in part obvious and in part pointed out hereinafter.

The nature of the invention will be apparent to those skilled in the art from the following description of an embodiment of a machine and process for manufacturing the product.

In the accompanying drawing.

Corresponding reference characters refer to corresponding parts throughout the several views of the drawing.

Figure 1:
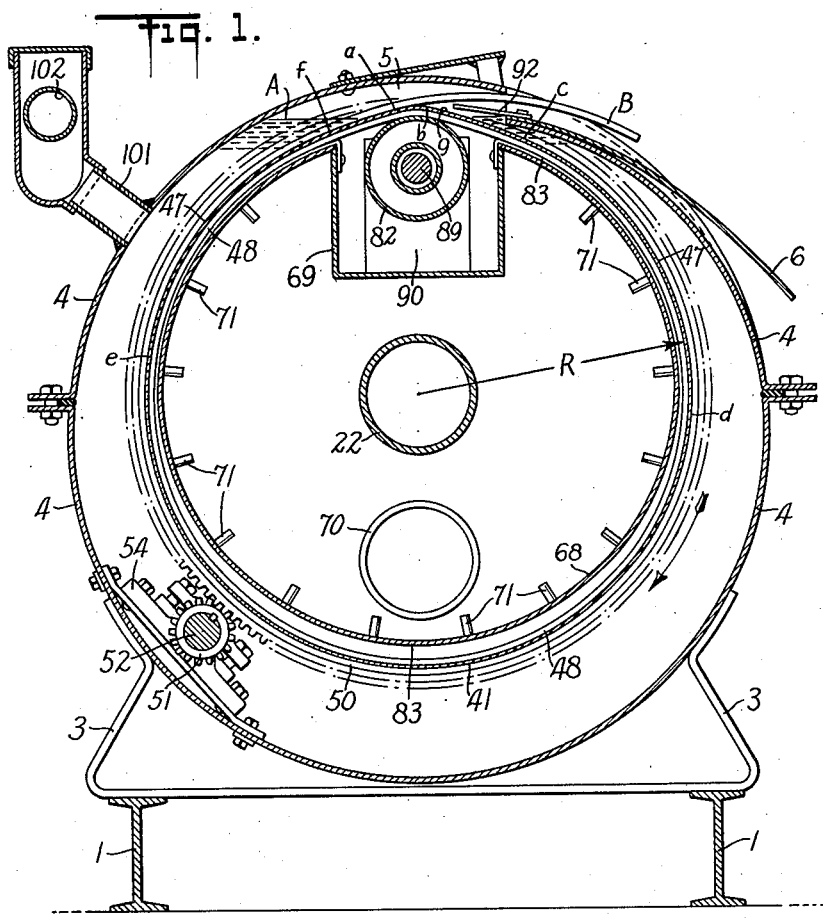
Figure 1 is a vertical cross-section of apparatus suitable for manufacturing the product embodying the invention.

There has long been a need for a brine ice product such as that embodying the present invention. The old method of freezing a brine in the block form, even when a eutectic brine was frozen, did not produce a uniform product homogeneous throughout, nor did it produce a product having a constant melting point. Consequently relatively little of such brine ice was manufactured and sold. In place of it was used a mixture of crushed ice and rock salt even though such a mixture gave relatively poor results and non-uniform temperatures because of the difficulty of obtaining uniform mixtures. It is an object of the present invention to provide a brine ice which is homogeneous throughout, and which, if frozen from a sodium chloride eutectic brine, has a constant melting point of —6° F.

As described in the parent application the apparatus to be described here is particularly adapted for the manufacture of a brine ice. When used for this purpose a calcium chloride brine (or what will be referred to hereinafter as refrigerating brine) is preferably used as the refrigerating medium for freezing the sodium chloride brine, or what will be referred to hereinafter as ice brine. The concentration of the two brines is preferably so regulated that the temperature of the calcium chloride brine may be reduced sufficiently to freeze satisfactorily a sodium chloride brine having a concentration which carries its freezing point down as low as —6° F. Of course, for non-eutectic ices the same brine that is used for the refrigerating may be used as the ice brine provided the concentration of the salt in the latter is less than in the refrigerating brine.

Referring to the drawing, there is shown some of the parts of ice-making apparatus fully described in the afore-mentioned patent. A tank 4 mounted on suitable supports 1 and 3, is supplied with ice-making brine, or ice brine (in the present embodiment sodium chloride) which is maintained at a desired level A by means of a float 102. Suitably rotatably mounted within the tank is a flexible cylinder 47 which may comprise a plurality of flexible joined metal panels. The cylinder may be provided with rigid driving gears 50 driven by a pinion 51 mounted on a driving shaft 52 suitably driven by a motor not shown. Freely rotatably mounted inside the top of the tank 4 and inside the flexible cylinder 47 is a roller 82 over which the flexible cylinder passes at the uppermost portion of its path of rotation. The upper locus of the roller 82 is above the normal line of curvature of the cylinder 47 and so causes a flexing of the cylinder. Further, the diameter of the roller 82 is considerably smaller than that of the diameter of the cylinder and so produces a relatively sharp flexing of the cylinder as it passes over the roller.

Mounted within the flexible cylinder is a stationary drum 68 whose upper portion serves as a guide for the cylinder 47 to prevent too great a flexing of the cylinder in its upper side regions. The drum also has a rectangular box-like portion in its top section to provide room for the roller 82. The walls of the drum are provided with nozzles 71 through which refrigerated brine flowing into drum 68 is directed against the inner walls of the flexible cylinder. As described in the aforementioned patent, the nozzles 71 may be arranged concentrically with the center lines of the respective panels making up the flexible cylinder.

It is clear from the foregoing description that the cylinder rotates past jets of cold refrigerating brine issuing from the nozzles 71, which causes a continuous layer of brine ice to form on the metal sheets of the cylinder as they move through the ice brine in the tank 4. This ice formation clings to the cylinder with great tenacity so long as the cylinder retains its normal shape, but is readily removed if the cylinder is deflected sufficiently from its normal shape. Because the brine ice will peel from the cylinder at any point where the cylinder is sufficiently deflected and because it is desirable to peel the ice only at the top of the cylinder where it projects above the liquid level in the tank, provision is made to maintain substantially the normal shape of the cylinder at points below the level where the brine ice is forming thereon, and to deflect that portion of the cylinder which extends above the liquid level to cause peeling of the brine ice at that point only. The deflecting mechanism is also designed to remain in constant deflecting position at the top of the cylinder, so that as the cylinder rotates a substantially continuous peeling of product from the cylinder will occur at that point and the brine ice will be peeled off in long strips or ribbons and pass onto the chute 6 for delivery to a storage bin.

As shown in Figure 1, the cross-sectional form of the cylinder is controlled by the peripheral wall 68 of the drum and by the deflecting roller 82. The exterior of wall 68 of the drum is provided with a plurality of strips 83 of Monel metal or other resistant material of sufficient width to permit rubber strips or tracks 48 of the cylinder to bear thereagainst. The rubber strips 48 of the cylinder contact with and slide upon the strips 83 of the drum except at and adjacent to the bottom of the drum, at which point a slight space intervenes between the strips 83 on the drum and the strips 48 on the cylinder, thus permitting a free flow of the refrigerating brine longitudinally of the cylinder at its bottom. Thus it will be seen that the drum by its contact with the cylinder maintains substantially the normal curvature of the cylinder below the liquid level while the brine ice is being formed thereon. Such an arrangement insures the production of brine ice free of cross-cracking.

As shown in Figure 1, deflecting roller 82 is located in the space formed by the U-shaped wall 69 of the drum. Roller 82 is located a sufficient distance above the axis of rotation of the cylinder to raise and deform the cylinder at this point, i. e., above the ice-brine level A.

As best shown in Figure 1, the drum 68 and the deflecting roller 82 cause the freezing cylinder to take a general shape as follows: section $a$ to $b$ assumes the curvature of the deflecting roller 82; section $b$ to $c$ assumes almost a straight tangent to the point of tangency $c$ with the cylinder; section $c$ to $d$ assumes the curvature of the drum; section $d$ to $e$ assumes an elliptical shape depending upon the relative pressure and weight of the refrigerating brine and fluid within the cylinder and the ice brine between the cylinder and the tank; section $e$ to $f$ assumes the curvature of the drum similar to the curvature of section $c$ to $d$; and section $f$ to $a$ assumes the curved tangent similar to section $b$ to $c$. As a result of this configuration of the cylinder, when it is rotated in the direction indicated by the arrow in Figure 1 and with the ice brine maintained at level A, the product on the cylinder begins to freeze at the point marked $g$. The brine ice remains, however, quite flexible, because of its extreme thinness from points $g$ to $d$, and continues to build up and thicken until it assumes a rigid shape having a definite curvature of the radius "R" shown in Figure 1. Due to the curvatures of the section $a$ to $b$, the product peels off between the points $a$ and $b$ in long strips which pass onto a plate 92 secured to the tank 4 and thence onto the chute 6, down which they slide into a storage bin. The peeled strips are caused to break off at intervals when the end of a strip comes in contact with the chute 6.

Figure 3:
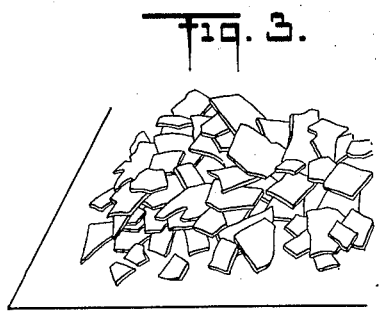
Figure 3 shows a mass of a product embodying the invention.
Figure 2:
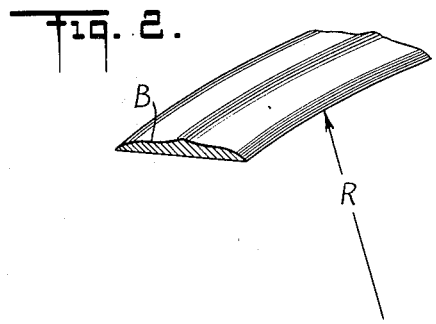
Figure 2 is a cross-section of a product embodying the invention.

The cross-section of the strip thus formed is shown in Figure 2. Its upper surface is raised at the center and tapers downwardly toward each side of the strip. However, the nozzles 71 may be so located as to cause the strips to have a cross-section of uniform thickness throughout. The strips of ice thus formed break into smaller pieces as they fall from the chute into the storage bin. Each piece has two principal exposed surfaces joined by materially less extensive side or edge portions so that as each piece of ice melts its exposed surface area remains substantially constant although its mass decreases. Further, as shown in Figure 3, the principal surfaces are curved so that when pieces are stored in bulk, they contact one another only along edge portions, and do not congeal rigidly together. The additional curvature of the ice pieces shown in Figure 2 adds to the irregularity of the pieces and so tends further to prevent the pieces congealing together when stored in bulk.

Brine ice thus formed in strips or in thin pieces has many commercial uses in the handling, storage, and transportation of food products, and it is essentially new and has many useful characteristics. It is substantially uniform over varying periods of time and a cross-section through each piece of brine ice is substantially homogeneous. This is true whether the solution being frozen is a eutectic solution or not. The reason for this homogeneous character of the product is probably because the relatively rapid transformation of the liquid to the solid ice form carries with it molecules of the salt so that the concentration of the remaining solution remains the same. While other explanations may later be found to explain this unique formation of the product, nevertheless the fact remains that the product is substantially homogeneous throughout.

Further, the product as it comes off is substantially dry—cooled below —6° F. so that it is subcooled as water ice may be subcooled below 32° F. This characteristic of the product enables it to be stored in cold storage without having the individual pieces freeze together. When a eutectic brine solution is frozen it has been found that the same uniformly homogeneous product results, and one which has a constant melting point—constant at —6° F.

As pointed out above, the old methods for freezing brine ice in the block form even when freezing a eutectic brine did not produce a uniform product, homogeneous throughout, nor did it produce a product having a constant melting point. Hence the brine ice product embodying the present invention is essentially new. Further, the product being in a solid dry form in contradistinction to a mush or slush form has certain advantages in that it can be stored, is free flowing and permits of the circulation of air being refrigerated through the interstices between the pieces. Further, being dry it has the maximum number of B. t. u. per pound for refrigerating purposes.

As various embodiments might be made of this invention, and as various changes might be made in the construction herein described, all without departing from the scope of the invention, it is to be understood that all matter herein set forth or shown in the accompanying drawing is to be interpreted as illustrative and not in a limiting sense.

I claim:

1. As a product of manufacture, a mass of dry brine ice in bulk form comprising relatively thin, at least partially pre-formed pieces having substantially the same salt concentration and each piece having the salt and water distributed substantially evenly throughout so that the product is substantially homogeneous, each piece also having two principal exposed surfaces, at least one of which surfaces has portions out of rectilinear alignment with other portions of the surface and materially less extensive side or edge portions adjoining said principal surfaces whereby the ratio of surface area to mass is increased to provide greater surface for heat transfer.

2. As a product of manufacture, a mass of brine ice in bulk form comprising relatively thin, at least partially pre-formed pieces having substantially the same salt concentration and each piece having the salt and water distributed substantially evenly throughout so that the product is substantially homogeneous, each piece also having two principal exposed surfaces, at least one of which surfaces has portions out of rectilinear alignment with other portions of the surface and materially less extensive side or edge portions adjoining said principal surfaces whereby the ratio of surface area to mass is increased to provide greater surface for heat transfer.

CROSBY FIELD.